US011679994B2

(12) United States Patent
Rock

(10) Patent No.: US 11,679,994 B2
(45) Date of Patent: Jun. 20, 2023

(54) ATOMIZER FOR USE IN WATER TREATMENT AND METHOD FOR ITS USE

(71) Applicant: MICRONIC TECHNOLOGIES, INC., Bristol, VA (US)

(72) Inventor: Kelly Rock, Bristol, VA (US)

(73) Assignee: MICRONIC TECHNOLOGIES, INC., Bristol, VA (US)

( * ) Notice: Subject to any disclaimer, the term of this patent is extended or adjusted under 35 U.S.C. 154(b) by 1 day.

(21) Appl. No.: 17/220,371

(22) Filed: Apr. 1, 2021

(65) Prior Publication Data
US 2022/0315448 A1 Oct. 6, 2022

(51) Int. Cl.
| | |
|---|---|
| C02F 1/04 | (2023.01) |
| C02F 1/12 | (2023.01) |
| C02F 103/00 | (2006.01) |
| C02F 101/20 | (2006.01) |

(52) U.S. Cl.
CPC .............. C02F 1/048 (2013.01); C02F 1/12 (2013.01); C02F 2101/20 (2013.01); C02F 2103/003 (2013.01)

(58) Field of Classification Search
USPC .......... 96/234; 261/54–62, 78.1; 239/8, 398, 239/402–405
See application file for complete search history.

(56) References Cited

U.S. PATENT DOCUMENTS

| | | | | |
|---|---|---|---|---|
| 4,255,125 A * | 3/1981 | Auclair | ................. | F23D 11/102 239/402 |
| 4,919,333 A * | 4/1990 | Weinstein | ................. | B05B 5/04 239/223 |
| 5,848,750 A * | 12/1998 | Schwab | ..................... | B05B 7/10 239/432 |
| 6,142,388 A * | 11/2000 | Schwab | ................. | B05B 7/0466 239/590.5 |
| 6,293,121 B1 * | 9/2001 | Labrador | .................. | F03D 5/00 62/304 |
| 6,669,176 B2 * | 12/2003 | Rock | ................. | A61M 15/0086 128/200.14 |
| 6,811,690 B2 * | 11/2004 | Arnaud | ................ | B03D 1/1418 210/512.1 |

(Continued)

OTHER PUBLICATIONS

International Search Report and Written Opinion of the International Searching Authority dated Mar. 27, 2023, issued in corresponding International Patent Application No. PCT/US2022/021535.

*Primary Examiner* — Randy Boyer
*Assistant Examiner* — Juan C Valencia
(74) *Attorney, Agent, or Firm* — Pillsbury Winthrop Shaw Pittman, LLP

(57) ABSTRACT

An atomizer for use in a water treatment system includes an influent inlet, to receive a flow of fluid containing contaminants a gas flow inlet, to receive a flow of gas to be mixed with the fluid in a mixing zone, an airflow controlling component, including an array of vanes disposed between the gas flow inlet and the mixing zone to impart a rotational component to a direction of flow of the gas. A channel receives the flow of fluid containing contaminants, and conducts the flow of fluid containing contaminants to the mixing zone, wherein radially outwardly flowing fluid containing contaminants is mixed with radially inwardly flowing gas to atomize the fluid containing contaminants, and an outlet.

15 Claims, 11 Drawing Sheets

(56) References Cited

U.S. PATENT DOCUMENTS

| | | | |
|---|---|---|---|
| 7,681,569 B2* | 3/2010 | Rock | A61M 11/002 |
| | | | 128/200.14 |
| 7,694,944 B2* | 4/2010 | Gottlieb | B05B 7/10 |
| | | | 261/78.2 |
| 9,044,692 B2* | 6/2015 | Rock | B01D 45/06 |
| 9,504,932 B2 | 9/2016 | Noel et al. | |
| 9,546,099 B2* | 1/2017 | Rock | C02F 1/048 |
| 10,137,384 B2 | 11/2018 | Rock | |
| 10,472,257 B2* | 11/2019 | Wan | B01D 9/0027 |
| 10,507,402 B2* | 12/2019 | Rock | B01D 1/14 |
| 11,420,881 B2* | 8/2022 | Katz | B01D 3/065 |
| 2002/0153428 A1* | 10/2002 | Koveal | B01J 8/1827 |
| | | | 239/11 |
| 2007/0169773 A1* | 7/2007 | Rock | B05B 7/0416 |
| | | | 128/200.14 |
| 2011/0192910 A1* | 8/2011 | Bedetti | B05B 1/00 |
| | | | 239/398 |
| 2011/0309162 A1* | 12/2011 | Rock | B01D 45/16 |
| | | | 239/289 |
| 2014/0034478 A1* | 2/2014 | Rock | C02F 1/04 |
| | | | 202/197 |
| 2014/0262055 A1* | 9/2014 | Noel | B01B 1/005 |
| | | | 261/78.2 |
| 2017/0225096 A1* | 8/2017 | Rock | B05B 7/00 |
| 2022/0315448 A1 | 10/2022 | Rock | |

* cited by examiner

ATOMIZER FOR USE IN WATER TREATMENT AND METHOD FOR ITS USE

BACKGROUND OF THE INVENTION

Embodiments described herein relate to systems and methods for removing a solute from a solution. More particularly, the embodiments described herein relate to systems and methods for the removal of organisms, minerals, other dissolved solids and/or contaminants from water using an atomizer.

There is a need in the industry to develop a zero liquid discharge system for removing solutes from fluid. In particular, concentrated industrial waste brines can be difficult to dispose of, requiring costly shipping to a processing center along with the subsequent processing in evaporator systems which may also be expensive in terms of energy usage as well as economic costs.

By 2050, global water demand is projected to increase by 55% mainly due to growing demands from manufacturing, thermal electricity generation, and domestic use. While 70% of the world's fresh water supply is used for agricultural purposes, in developed countries the industrial market is the biggest consumer, a trend expanding to other developing markets. Of the billions of gallons of industrial water used daily, 69%, while treated for discharge, is not reused. The U.S. alone produces over 90 trillion gallons of wastewater each year that is not reused.

Water recovery from saline sources, such as seawater; brackish ground water; reverse osmosis reject streams; produced water; wastewaters; and industrial process waters; is necessary to meet municipal and industrial water needs in many regions. Desalination technologies are problematic due to high total dissolved solids (TDS) concentrated in the reject stream, extensive logistics and supply chain required, and its negative environment impact. The disposal of concentrated brine reject streams from treatment processes has significant environmental impact, particularly in arid and inland areas. Evaporator systems are the only viable solution to treat and reuse wastewater, especially for the zero liquid discharge (ZLD) objective. However, this type of treatment of brine reject from desalination systems and industrial processes is particularly energy intensive, very costly, and technically challenging.

The dairy industry, for example, produces both chloride containing wastewater, and reverse osmosis retentate, both of which require additional treatment before re-use or disposal. Reuse of the chloride (brine) waste stream requires concentration and removal of contaminants, while the nanofiltration/reverse osmosis retentate is generated during whey processing and can be concentrated for use as animal feed. In principal, such processing can result in a reduction in the amount of water required for dairy farms to pump out of the ground and at the same time provide minerals that the cows need. In addition, reusing the concentrated wastewater for road deicing (non-food grade) by local authorities can save 15% in rock salt use. Such processing can provide potable water, concentrated dairy solids for use in animal feed, and result in the aforementioned zero liquid discharge into the environment of contaminated water. Any remaining slurry can be dried and encapsulated, and safely landfilled.

Thus the inventors have realized a need for a system that may be used for water purification and in particular for ZLD applications. ZLD is becoming an industry priority as the water market moves to a more sustainable future; driven mainly by environmental, economic, and regulatory pressures. The need for evaporative technologies to better manage concentrated wastewater and reduce disposal cost for industry seeking ZLD treatment is growing. A system that is able to implement a ZLD process by concentrating highly contaminated wastewater streams from current industrial processes without large capital and operating expenses and logistics supply chain of current evaporators is therefore desirable.

Thus, a need exists for improved systems and methods for water purification.

SUMMARY AND OBJECTS OF THE INVENTION

In an embodiment, a water treatment system includes an atomizer that has an influent inlet, configured and arranged to receive a flow of fluid containing contaminants, a gas flow inlet, configured and arranged to receive a flow of gas to be mixed with the fluid in a mixing zone, an airflow controlling component, the airflow controlling component comprising a plurality of vanes, the vanes being disposed between the gas flow inlet and the mixing zone, and configured and arranged to impart a rotational component to a direction of flow of the gas, the airflow controlling component further having a downstream face that is arranged adjacent to and spaced apart from a cooperating upstream face of a second component, the downstream face of the airflow controlling component and the cooperating upstream face of the second component together defining the mixing zone, the second component further defining a channel, in fluid communication with the influent inlet and configured to receive the flow of fluid containing contaminants, and to conduct the flow of fluid containing contaminants to the mixing zone, the channel and mixing zone being configured and such that, in use, radially outwardly flowing fluid containing contaminants is mixed with radially inwardly flowing gas to atomize the fluid containing contaminants, and an outlet, configured and arranged to receive atomized material from the mixing zone and to output it, wherein adjacent pairs of vanes of the plurality of vanes define a channel therebetween, and an each vane is configured such that a width of an outlet side of the channel is greater than a width of a central region thereof.

In an embodiment, a water treatment system includes a blower motor, configured and arranged to blow a mixture of air and feed water influent containing contaminants through the system, a primary evaporator, including an atomizer as described herein configured and arranged to impart rotational velocity and radial velocity to the mixture to atomize it, and a heat exchanger that is configured to receive the mixture from the primary evaporator and to act as both a secondary evaporator, and to receive the mixture from the primary evaporator, and is further configured to act as a primary condenser.

In an embodiment, a method of operating a water treatment system of the preceding paragraph includes operating the system as described herein.

In an embodiment, the atomizer includes a mechanism for adjusting a size of the volume of the mixing zone. In an embodiment, the mechanism includes movable portions that can be adjusted to alter a distance between substantially parallel walls defining the mixing zone to adjust the volume.

In an embodiment, the atomizer includes a bulbous projection extending into the outlet, that is configured and arranged to reduce dead zones. That is, the bulbous projection occupies spaces that would otherwise be dead zones, or generally reduces regions of low flow speed. The bulbous projection may be, for example, conical or paraboloid in shape.

BRIEF DESCRIPTION OF THE DRAWINGS

The invention may be better understood with reference to the drawings.

DETAILED DESCRIPTION

In one type of system for water purification, a cycle is driven by a blower motor (shown as 30 in FIG. 1) which pushes air and fluid (which may be in the form of steam in some portions of the circuit) to be processed into evaporators. The fluid to be processed includes material in solution or entrained that is to be removed from the fluid for disposal. The solute may include, for example simple salt (sodium chloride) or the fluid may be industrial wastewater incorporating any variety of solutes that may be considered contaminants. For example, the fluid may include suspended solids, dissolved solids, bacteria, heavy metals, fungi, pharmaceuticals, plastic particles, and nano materials. In the case of food production such as cheese production, wastewater may include large loads of organic waste along with saline loads.

The blower may be, for example, a centrifugal pump or blower that produces a flow of air (e.g., inlet air) having a flow rate of between 30 cubic feet per minute and 3000 cubic feet per minute and a pressure of between 3 p.s.i. and 40 p.s.i. In some embodiments, the blower can produce a pressurized airflow within a plenum or the like having a pressure of approximately 5 p.s.i. at a flow rate of approximately 300 cubic feet per minute. An intercooler, not shown, can optionally be included to heat up the air on its way to the evaporator. Beneficially, the intercooler, along with waste heat from the power supply may also be used to warm water that is provided to the evaporator.

Figure 1:
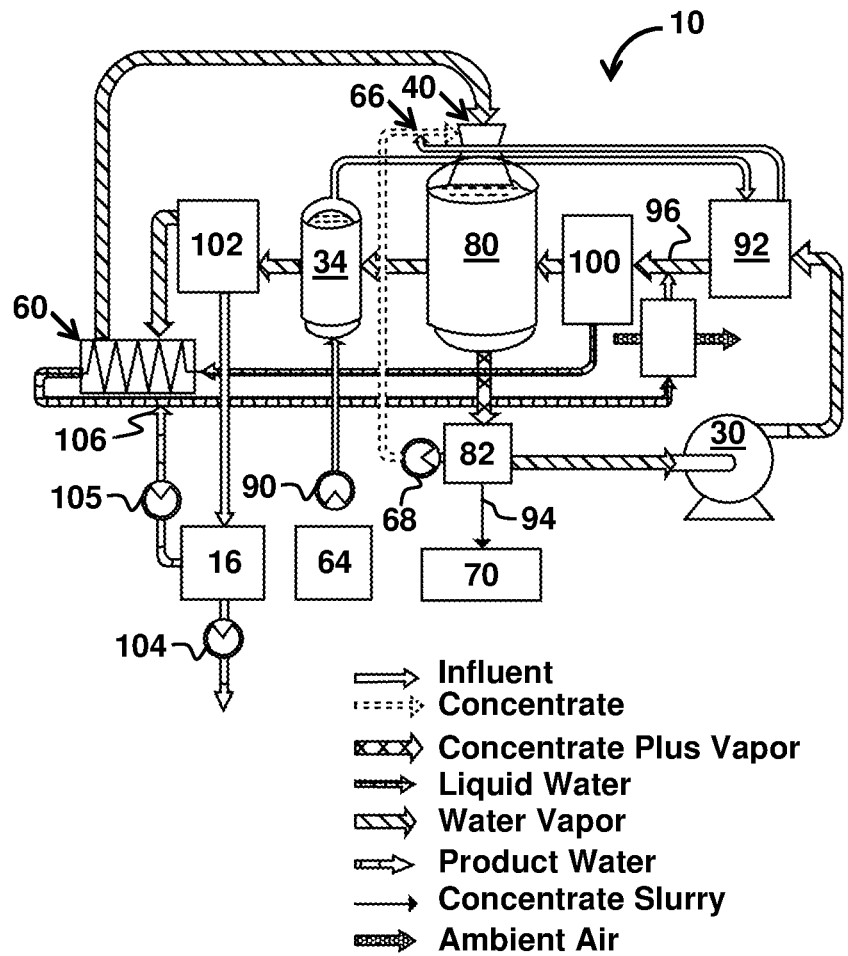
FIG. 1 is a schematic diagram of a water processing system in accordance with an embodiment.

FIG. 1 schematically illustrates an embodiment of a water processing system 10. In this embodiment, influent water is pumped from the influent tank 64 via influent pump 90 through a secondary condenser 34, which acts as a heat exchanger to warm the influent with heat from the vapor flow passing through the condenser side of the secondary condenser 34.

Optionally, an influent preheater 92 may be arranged downstream of the blower 30. The influent preheater 92 is a heat exchanger configured to remove heat from the air/vapor loop generated in a blower 30 and use that heat to further preheat the influent flow.

From the influent preheater 92, the influent is passed to the mixing point 66 where it is combined with recirculated concentrate. A recirculated concentrate feed pump 68 provides the flow of recirculated concentrate from the concentrate separator 82. The mixed recirculated concentrate and preheated influent is atomized at the atomizer/primary evaporator 40. The atomizer 40 (which may also be referred to as the "pod") is a device that is configured to mix liquid influent water with high velocity rotating air to atomize the fluid.

The atomizer 40 is shaped such that it imparts an angular velocity and a radial inward velocity to the water droplets and is able to saturate the air. Specifics of the construction of an embodiment of such an atomizer 40 are described below in reference to FIGS. 3-11

The output of the atomizer/primary evaporator 40 is predominantly fine aerosols entrained in the airflow and the aerosol particulates. The interface device acts to preserve the aerosols as they pass down the inside of the tubes. The heat moving through the walls of the tubes is heating the air, which lowers the relative humidity, allowing the aerosols to evaporate further.

The atomizer 40 is configured to produce a helical flow directed radially inward in the atomizer 40. This flow passes from the atomizer 40 into the evaporator/primary condenser 80 on the evaporator side which is the inside of the tube. This side, as described above, is maintained at a relatively low temperature and pressure. Because the blower motor 30 is on the outlet side of the evaporator 80, it produces vacuum inside the tubes, promoting evaporation in the inner region, while the outside is higher pressure promoting condensation in the outer region.

The action of the evaporator 80 produces water vapor, which is generally clean and constitutes the majority of the input water. The remainder of the water remains as a concentrated fluid—with a high concentration of contaminants which will generally be in a droplet form. The liquid concentrate and vapor are passed to the concentrate separator 82. In an embodiment, the separator 82 includes two components, a centrifugal type separator component, and a dispersion component, allowing the flows to slow down to permit the air and water to separate and the liquid to gather in a sump, where the concentrate is passed back via the recirculation pump to the mixing point 66. The concentrate is pumped from the concentrate separator 82 to the concentrate tank 70 via the slurry conduit 94, while the vapor and air are returned to the input of the blower 30.

The vapor and air first optionally pass through the influent preheater 92 to remove excess heat from the blower motor 30 and then cool water is injected at the water injection point 96 to further cool the vapor and air. The injection water is cooled by a heat exchanger 98 that uses ambient air as a coolant. The injection water, vapor, and air mixture passes through an injection water recovery separator 100 which is a centrifugal separator that separates water from air, and the now hot injection water may be passed through a heat exchanger 60 before being returned to the water injection point 96 via the heat exchanger 98. The other loop of heat exchanger 60 will be discussed further below.

The remaining vapor and air mixture passes through the primary condenser portion of the evaporator/primary condenser 80, then from there to the secondary condenser 34. At the primary condenser 80, the majority of the vapor is condensed to liquid. A remaining portion is condensed in the secondary condenser 34. The liquid, entrained in the airflow, passes through a liquid/vapor separator 102 where the product water is separated from the airflow. The airflow proceeds, via the heat exchanger 60 back to the evaporator to continue through the loop. Product water is pumped by pump 104 from the product tank 16. The heat exchanger 60 uses the airflow through its cool side to cool the injection water that is passing through the warm side of the exchanger 60. Simultaneously, the airflow is heated, lowering its relative humidity due to whatever amount of vapor remains entrained therein.

Optionally as shown, some of the product water may be pumped by injection water pump 105 to supply water for the injection loop where it may be injected at injection point 106. The reinjection serves to align the feed rate with the evaporation rate of the system. In an example, for 90 gal/day of feedwater, 300 gal/day of recirculated concentrate may be used. As the device is scaled up, it is expected that the recirculation amount will not increase in the same ratio, but rather may tend to stay at a similar rate of recirculation for a larger rate of feedwater processing. The amount of recirculation can be altered as necessary to maintain the feed rate in view of empirical evaporation rates.

Figure 2:
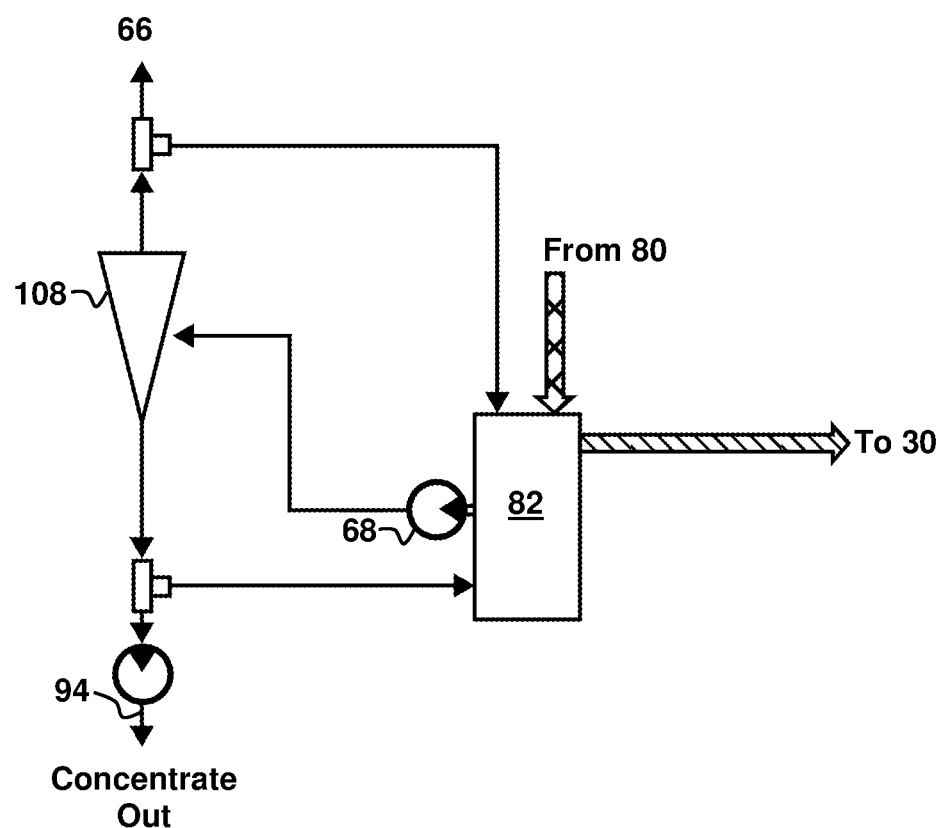
FIG. 2 is a schematic diagram of a portion of a water processing system in accordance with an embodiment.

FIG. 2 illustrates schematically a particular embodiment of the separator 82 and its associated components. In this embodiment, a hydrocyclone separator 108 is included after pump 68 to further separate the recirculated material into a slurry which is pumped via the slurry conduit 94 to the concentrate tank 70, and a solids-free liquid that is recirculated to the mixing point 66.

FIGS. 3-11 illustrate an atomizer 40 in accordance with embodiments. The atomizer 40 may be manufactured from materials including, for example, anodized aluminum, acrylic, stainless steel, aluminum, thermoset polymers, thermoplastic polymers, and composite materials or ceramics. Parts may be molded, cast, 3D printed, or machined as desired.

Figure 3:
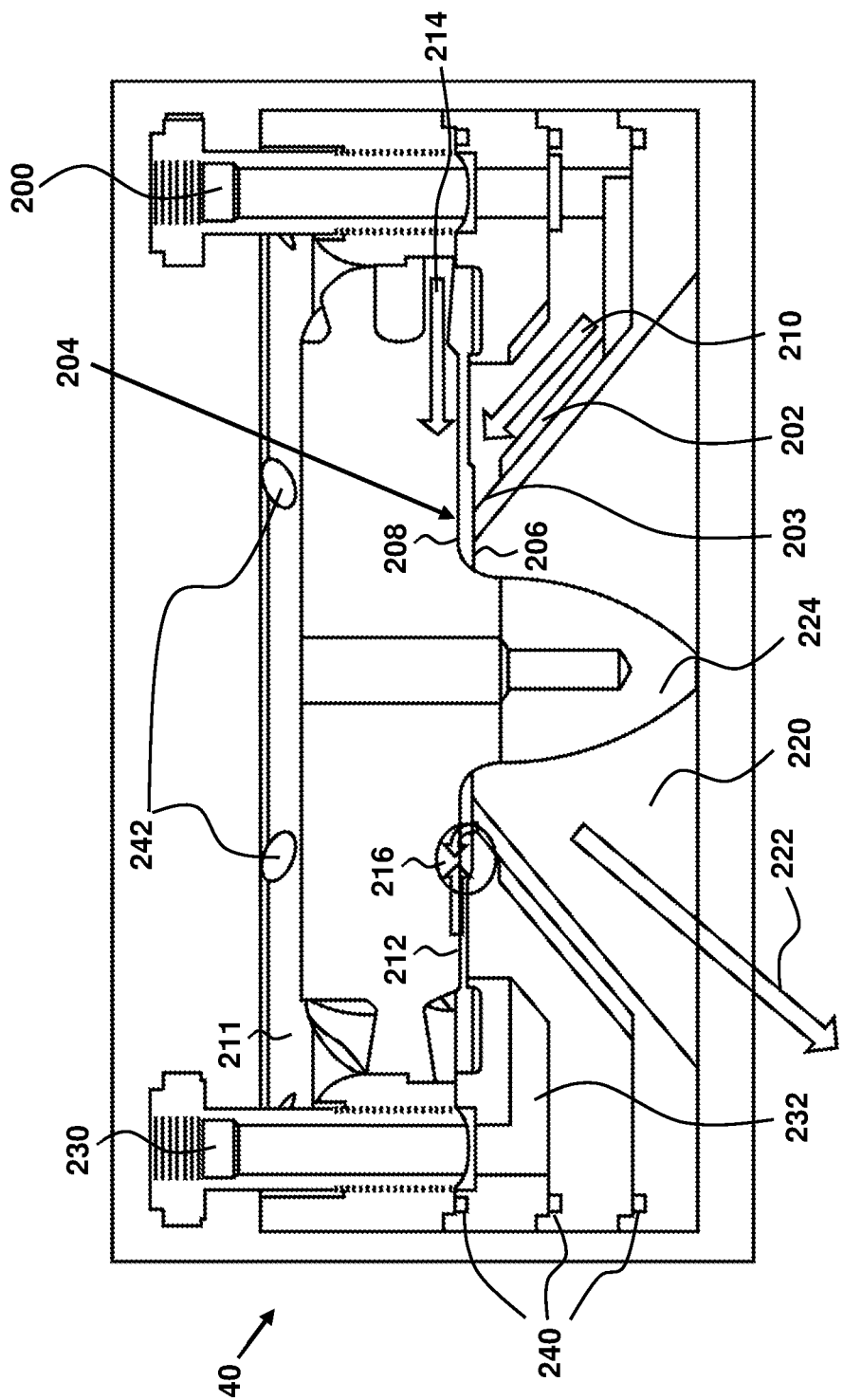
FIG. 3 is a cross-sectional elevation view of an atomizer in accordance with an embodiment.
Figure 4:
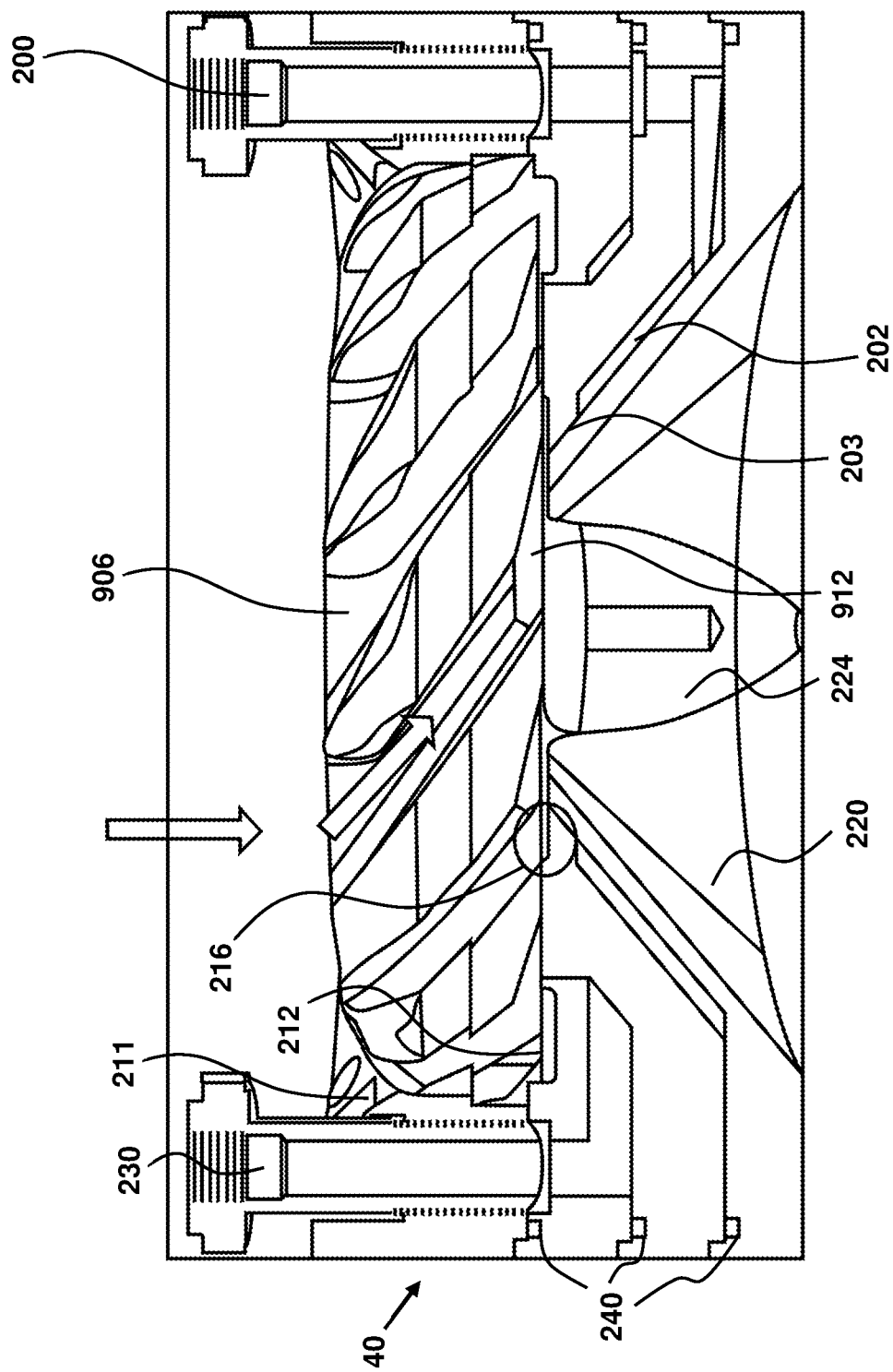
FIG. 4 is a partially cutaway elevation view of an atomizer in accordance with an embodiment.

FIG. 3 is a cross-sectional elevation view of an embodiment of an atomizer 40 while FIG. 4 is a partially cutaway elevation view of the atomizer. The atomizer includes an influent channel 200, through which influent enters the atomizer 40. The influent passes along the channel 200, though the frustoconical space 202, and through a narrower frustoconical region 203 into a region 204 defined between lower and upper flat surfaces, 206, 208, respectively. The influent flows into this region in an inflow direction indicated by arrow 210.

Simultaneously, air 211 flows through an array of vanes, or vectors, that impart a radially inward component as well as a rotational motion to the airflow, as will be discussed in greater detail below. The air then proceeds along an annular passage 212 formed between the lower and upper flat surfaces 206, 208, in an air inflow direction indicated by arrow 214. The inflow of air and the inflow of influent meet in a mixing zone 216 that is radially outward of the exit of the passage defined by the annular region 203. In an embodiment, the lower flat surface 206 includes an annular recess portion (218, best seen in FIG. 7) extending radially outward from a radially inner region and extending radially outward past the annular region 203.

Because the mixing zone 216 is defined by two substantially flat and parallel surfaces, an embodiment may provide for adjustability of the volume of the mixing zone. Specifically, by relative movement of the upper and lower flat surfaces 206, 208, the volume of the mixing zone may be increased or decreased, without significant redesign to the overall size and shape of the atomizer 40. Such adjustments may allow, for example, to modify a throughput of the atomizer, to reduce or eliminate dead zones in flow, to control the interaction between the influent flow and the air flow, or other effects that may result from altering the pressure ratios in the mixing zone. This differs, for example, from atomizers in which the mixing zone is defined by parallel conical or frustoconical surfaces, in that relative movement of such surfaces involves a change in angular relationship in addition to the change in volume, which either tends to result in unpredictable changes in flows, or requires modifying one or both of the surfaces to compensate for the changes in angular relationship.

A counterflow relationship between the air (flowing with a radially inward component) and the influent (flowing with a radially outward component) is established in the mixing zone as described above. These counterflows intersect, and where the air and the influent flows collide forcefully in the mixing zone, the surface tension of the fluid is rapidly and forcefully overcome by the airflow, and atomization of the influent occurs. The resulting stream of air mixed with atomized influent is then blown out though a frustoconical exit region 220, with a major component in a direction shown by arrow 222.

The inventor has found that flows through the exit region 220 tend to include "dead" spaces in a central portion of the region. These are portions of the region where airflows are relatively slower than other portions, which can result in the unwanted deposition of solids, often in crystalline form. To reduce this effect, a bulb 224 may be included in the central region that occupies the space that would otherwise contain slower airflows. The bulb 224 may be conical, cylindrical, or, as shown, generally conical with curved sides (for example, a paraboloid). The specific shape and volume of the bulb 224 may be determined empirically, for example by using flow visualization techniques to determine which regions tend to have dead space, or by observing locations where material accumulates.

In an embodiment, the atomizer 40 from time to time has feedwater injected via cleaning inlet 230 into its input flow path to clean any deposited solids. The cleaning feedwater flows into an annular cleaning water passage 232, and through a narrower passage into the region 204 where it flows radially inwardly, passing along through the mixing zone 216 and proceeding out through the exit region 220, along a path similar to that of the atomized influent.

The cleaning feedwater can remove deposited material, both by dissolving it, and by way of mechanical action. Cleaning may be on a schedule or an ad hoc basis in various embodiments.

As may be seen in FIG. 4, an airflow controlling component 900 is located in a central portion of the atomizer 40, such that influent flowing through the passages 202, 203 into the mixing zone 216 meets air flowing through the passage 212 in a controlled and defined manner.

In particular, the airflow controlling component 900 includes an array of vectors or vanes 902 that are configured to provide a rotational component to the airflow through the atomizer. Each vector 902 is angled relative to the axial direction of the airflow controlling component 900. Relative to the axial direction, this angle may be about 34°, but in general may lie in a range between about 30° and about 40°, or more particularly, in a range between 33° and 36°. Optionally, each vector includes a portion 904 on the upstream side that is curved or has a different angle from the primary angle of the vector 902. This curved portion 904 creates an inlet region 906 that is generally larger than the channel 908 between respective adjacent vectors. In other words, an upper portion of the channel 908 is wider than a central portion thereof.

Similarly, a portion 910 on the downstream side of each vector 902 likewise includes a curve or different angle from the primary angle of the vector 902. This creates an outlet region 912 that is generally larger than the channel 908 between respective adjacent vectors. That is, a lower portion of the channel 908 is wider than a central portion thereof. In principle, the vectors may be configured such that only one, or both, of the upper and lower portions of the channel 908 is wider than the central portion. The inventor has determined that, in particular, the use of a wider lower portion improves the throughput in the mixing zone 216.

Figure 9:
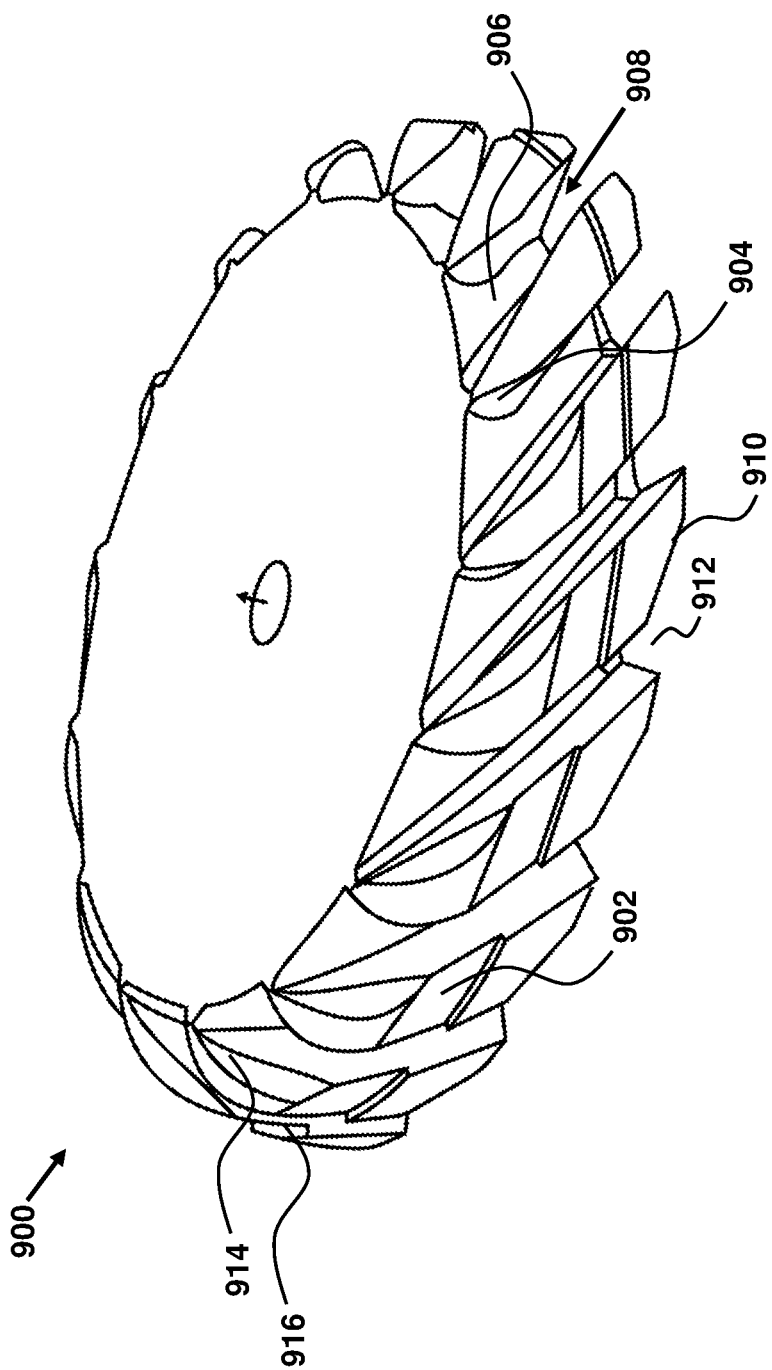
FIG. 9 is an isometric view of a vectoring component of an atomizer in accordance with an embodiment.

As shown in FIG. 9, the vectors may further include a rounded portion 914 at the upstream side. This rounding may improve airflow, by reducing sharp corners and providing a more streamlined path. Furthermore, each may include a sawtooth or shouldered portion 916 that can be used to engage corresponding cooperative shoulder structure 918 (see, FIG. 5) in the wall where the airflow controlling component 900 is supported and held, thereby holding it steady in place. In the case that the rounded portion and/or sawtooth portion 916 are included, the upper housing member 1000 includes corresponding cooperating structure to provide appropriate clearance for airflow therethrough.

In embodiments, the atomizer may be constructed from a stack of components, each formed to cooperate with adjacent components to define the necessary passages. In this approach, it may be useful to include grooves in mating surfaces of the components for holding respective o-rings 240. An array of fasteners can be used to tightly connect the components of the stack. For example, countersunk screws located in holes 242 may be used for this purpose.

Figure 5:
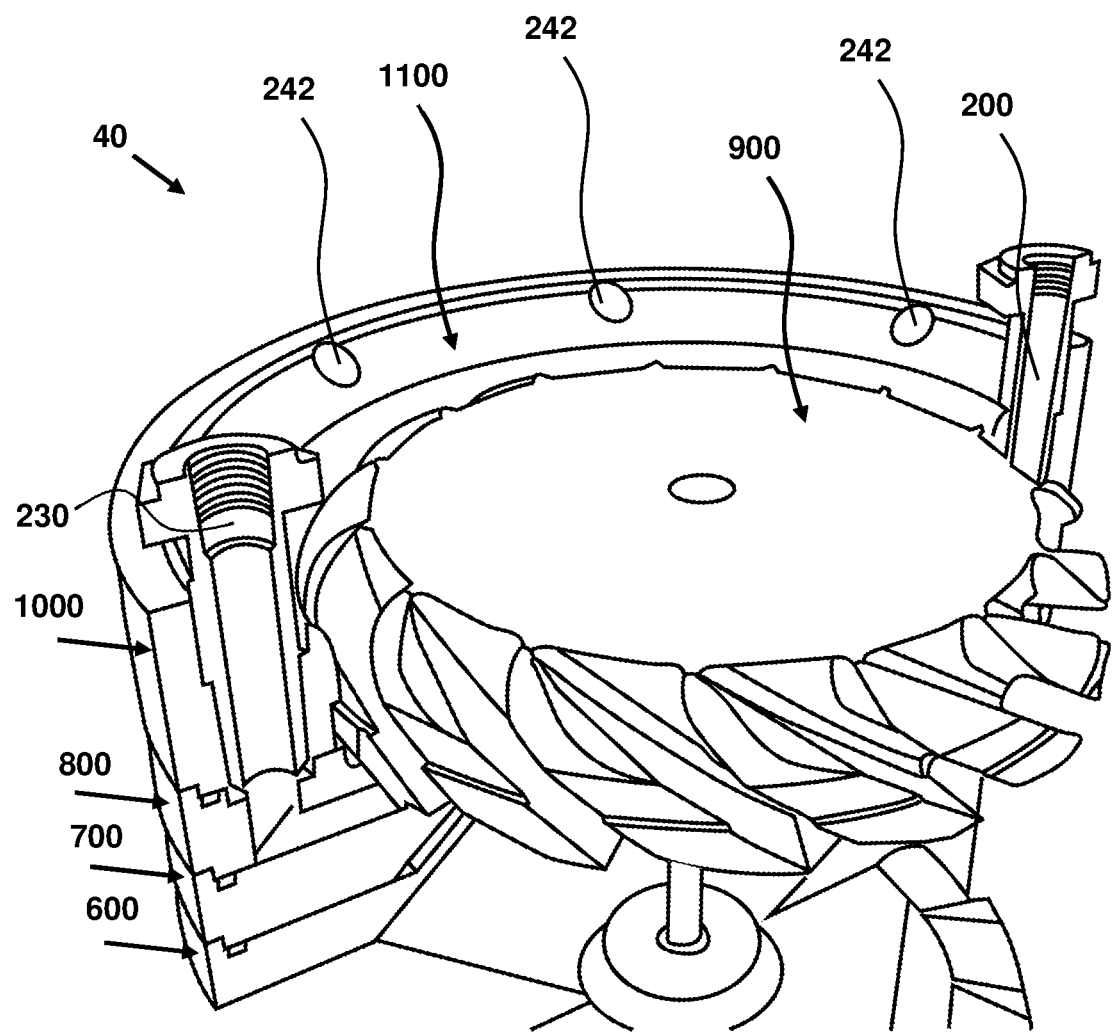
FIG. 5 is a partially cutaway isometric view of an atomizer in accordance with an embodiment.
Figure 7:
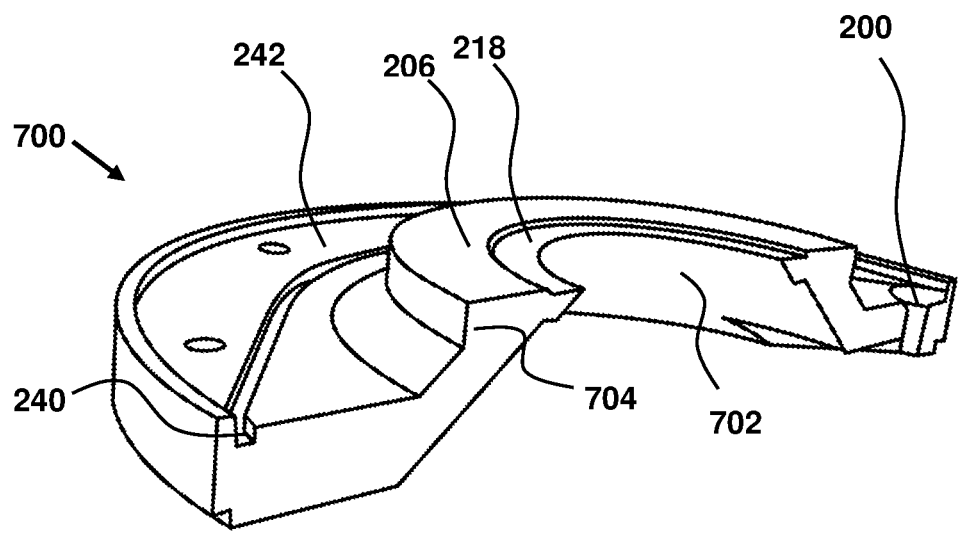
FIG. 7 is a partially cutaway isometric view of another component of an atomizer in accordance with an embodiment.
Figure 6:
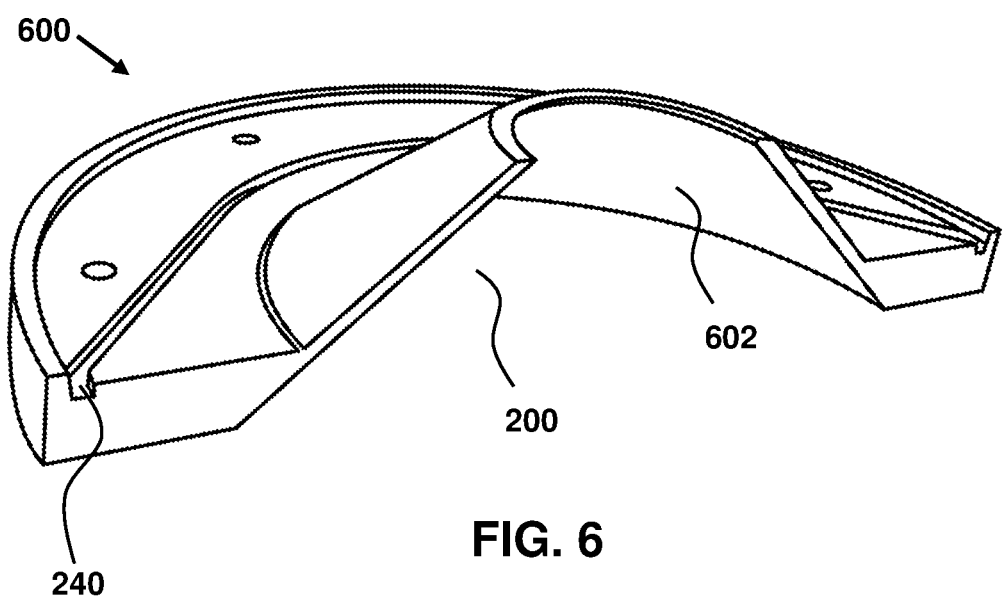
FIG. 6 is a partially cutaway isometric view of a component of an atomizer in accordance with an embodiment.
Figure 8:
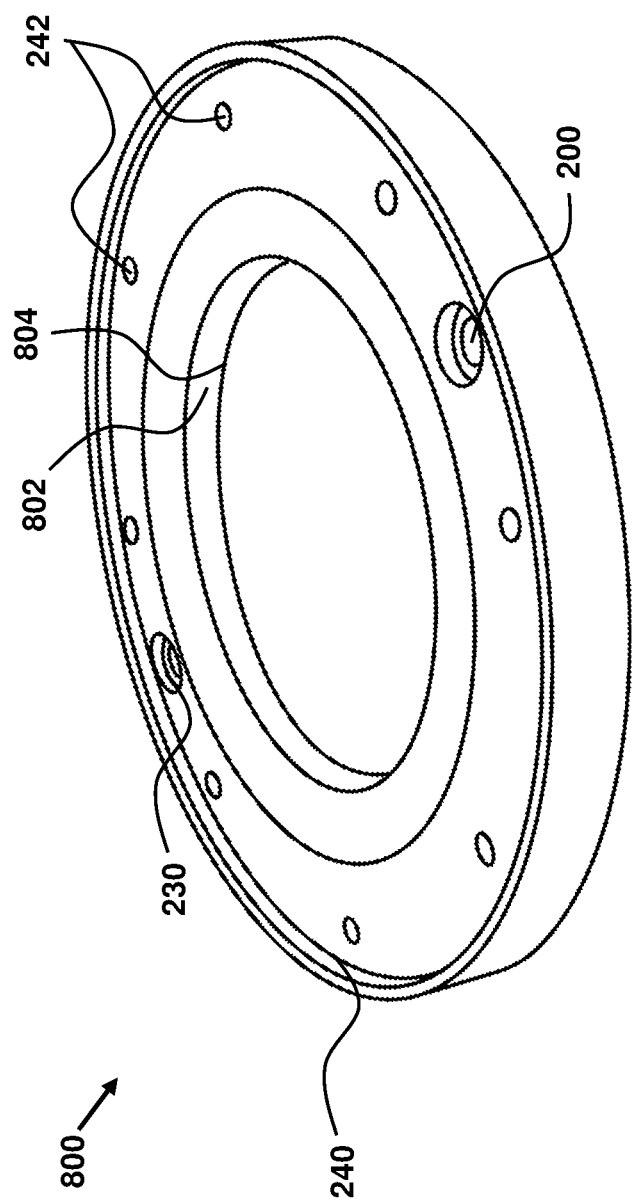
FIG. 8 is an isometric view of another component of an atomizer in accordance with an embodiment.

One example of such a stacked configuration includes a lower component (600, FIG. 6), a middle component (700, FIG. 7), and an upper component (800, FIG. 8). An airflow controlling component (900, FIG. 9) is held radially inward of upward extending inner ring-shaped wall 802 of the upper component 800. As seen in FIG. 5, an upper housing member 1000 has the primary function of surrounding and holding the airflow controlling component 900. Finally, a top (1100, FIG. 11) may be included to complete the stack.

As will be appreciated, the structure as shown and described need not necessarily be manufactured from a stacked set of components. Rather, the structural features including the various channels and passages may be manufactured into either a unitary or multipart atomizer. Any particular components as described may be made unitary in any combination. Thus, the middle and upper component may be unitary, or the middle, upper, and airflow controlling components may all together be made as a unitary structure.

In an embodiment of this type, the lower component 600 includes a frustoconical portion having a central inner surface 602 that defines the exit region 200 of the atomizer. An outer surface 604 of the frustoconical portion, when assembled with the adjacent middle component 700, defines the space 202 through which influent flows as shown in FIG. 3. In particular, a central inner surface 702 of the middle component 700 includes a shoulder 704 that provides an offset of the central inner surface 702 relative to the outer surface 604 of the lower component 600, cooperating to define the space 202 therebetween.

In similar fashion, the upper component 800 is configured with respective shoulders and offsets on its lower surface 804 such that it cooperates with the middle component 700 to define the space 232 for use in the cleaning process.

Figure 10:
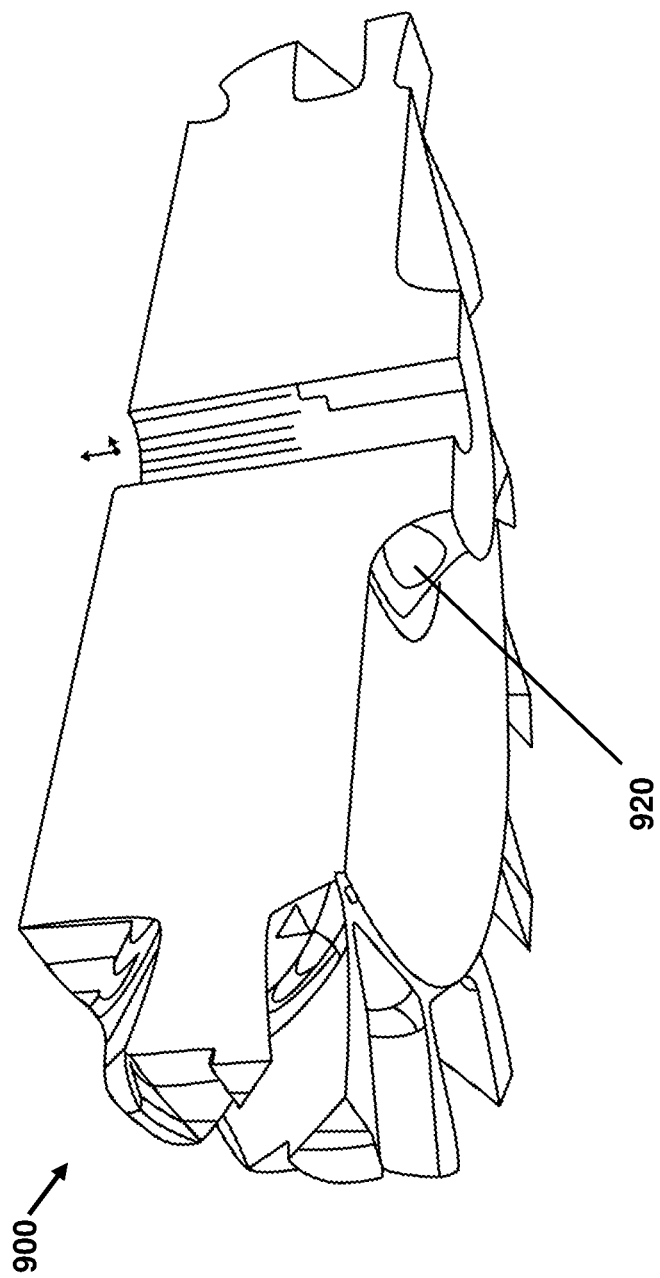
FIG. 10 is an partially cutaway isometric view, from below, of a vectoring component of an atomizer in accordance with an embodiment.
Figure 11:
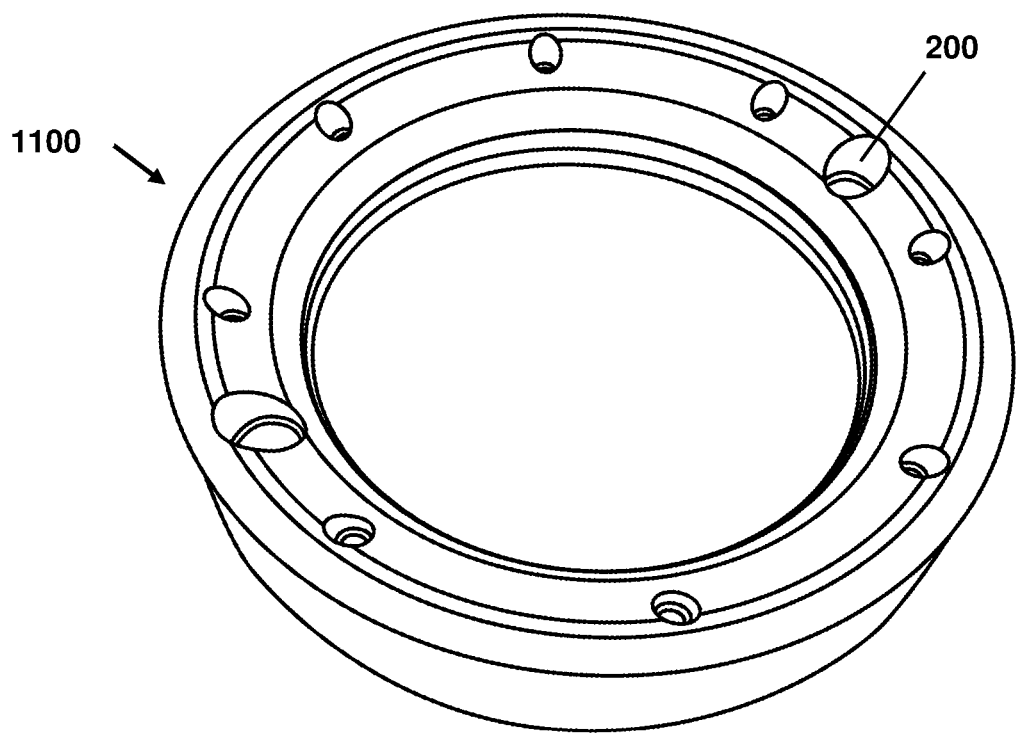
FIG. 11 is an isometric view of a component of an atomizer in accordance with an embodiment.

In an embodiment, as illustrated in FIG. 10, the airflow controlling component 900 may include a central projection 920 on a downstream side of the component. This projection 920 may be shaped, for example, to provide a surface against which the mixture of atomized material and air that comes from the mixing zone is directed downwards and out towards the exit region 220. Thus, as seen in FIGS. 3 and 10, the projection includes a curved surface that is configured to guide flow that is inwardly radially directed such that it proceeds in a downstream direction.

Figure 12:
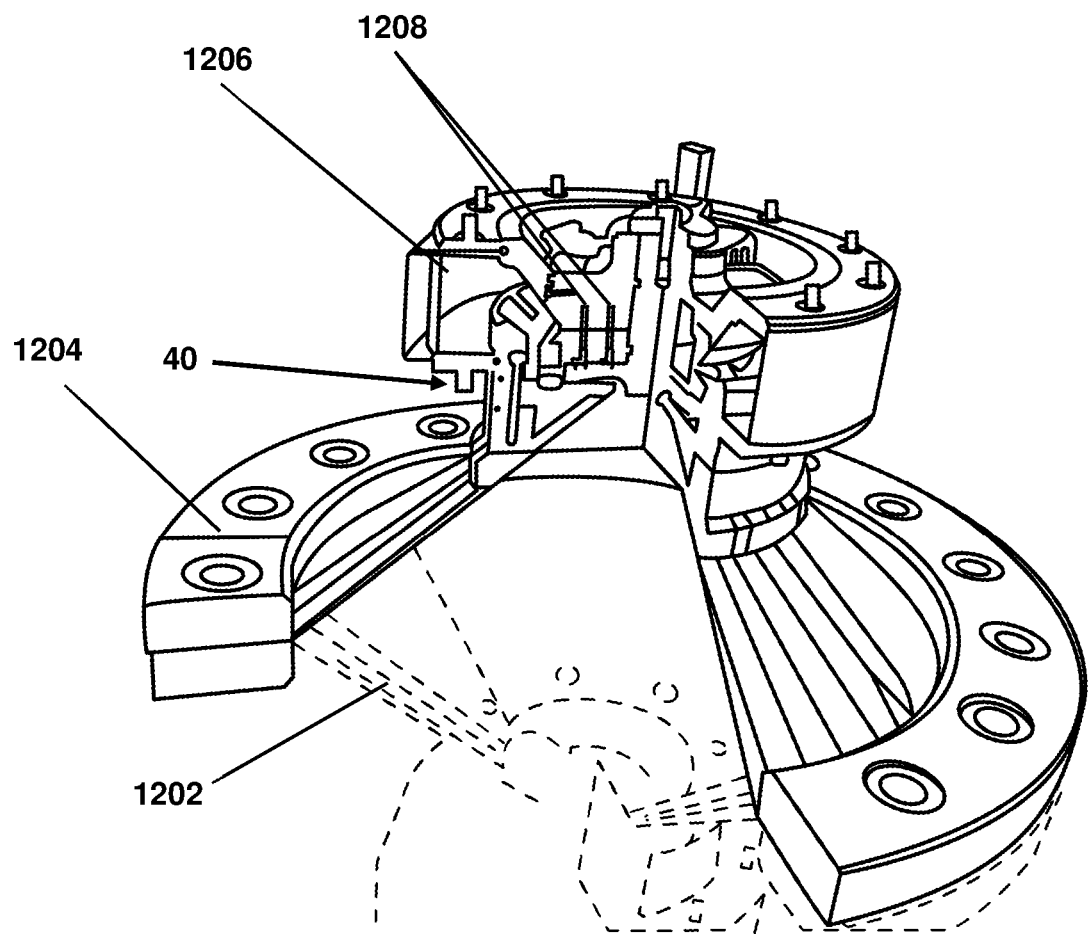
FIG. 12 is partial cutaway isometric view of an atomizer in accordance with an embodiment.

FIG. 12 shows an atomizer 40 assembled into a portion of a system for processing water as described above. The atomizer 40 is connected to an interface 1202 that is designed to guide flow from the atomizer to the evaporator/primary condenser 80. The atomizer 40 is connected to the interface 1202 by a flange 1204 that may be fastened, for example, with a plurality of screws (not shown). Also shown are a plenum 1206 through which air flows to the atomizer 40, and screws 1208 that can be used to adjust the volume of the mixing zone as discussed above.

In some embodiments, the water purification system can include a control system (not shown) to control the flow of air and or water within certain portions of the system. For example, the control system can include a set of components such as pressure sensors and adjustable valves to monitor and/or control the flow rate and pressure of air from the blower. Similarly, the flow rate, pressure, and/or saturation of the solution entering or exiting the atomizer assembly and/or the evaporator assembly can be controlled. In this manner, the saturation level of the mixture can be monitored and controlled. The term "sensor" can be understood to be a single sensor, an array of sensors having separate functions, and/or a multifunction unitary sensor.

The sensors may be monitored and controlled using a controller, which may be, for example, a programmable general purpose computer or a purpose-designed computer. In an embodiment, a first sensor monitors temperature, pressure, and flow rate at the evaporator input, while a second sensor monitors temperature and pressure of the evaporator output. Additional sensors are provided to monitor temperature and pressure of the blower input and output, to monitor temperature and pressure of the condenser input and output, and to monitor the temperature of the first heat exchanger liquid input and output. Likewise, sensors may be provided to monitor temperature of the vapor output of the second heat exchanger and to monitor temperature of the second heat exchanger liquid input and output.

In an embodiment, water may be injected into the blower output to cool it and re-saturate the air before going to the primary condenser/secondary evaporator, though this is not required. Likewise, the blower itself produces heat, and that heat can be used as part of the energy involved in operating the system by passing the output of the blower through a heat exchanger (intercooler, as noted above).

A method of treating water may include using an atomizer in accordance with any of the foregoing embodiments to atomize water in a water treatment system. Likewise, a water treatment system may include an atomizer in accordance with any of the foregoing embodiment.

Embodiments of the atomizer described herein may find use, for example, in systems of the type described in U.S.

patent application Ser. No. 17/274,006, filed Mar. 5, 2021, herein incorporated by reference in its entirety. As in the system described therein, one or both of the evaporators may be, for example, shell and tube heat exchangers. In a shell and tube heat exchanger, one fluid flows through the tubes while the other flows on the shell side of the tubes. Heat flows through the tube walls, so the material should be one that is a good conductor of heat. Additionally, it may be useful to use a material that is corrosion resistant and have sufficient strength to maintain pressure differentials between the zones of the exchanger and between the shell and the ambient pressure. Metals, including copper, copper alloys, stainless steels, aluminum, and nickel alloys may be used, for example. The use of a large number of tubes provides a large surface area for heat transfer.

The description of the present application has been presented for purposes of illustration and description, and is not intended to be exhaustive or limited to the invention in the form disclosed. Many modifications and variations will be apparent to those of ordinary skill in the art. For example, aspects of each embodiment may be combined with aspects of each other embodiment. As one example, the optional structure for providing adjustability may be used in any of the depicted embodiments, or may be omitted. Likewise, the stacked component approach to assembly is not required, but other manufacturing techniques may be used to create the atomizer having the relevant passages and plenums. Various embodiments of separators and heat exchangers may find use in each of the different described embodiments. The specific placement of pumps may vary from upstream to downstream of the tanks with which they interact. The embodiments were chosen and described in order to best explain the principles of the invention, the practical application, and to enable others of ordinary skill in the art to understand the invention for various embodiments with various modifications as are suited to the particular use contemplated. Unless otherwise specified, the term "about" should be understood to mean within ±10% of the nominal value. As used in this specification, the singular forms "a," "an" and "the" include plural referents unless the context clearly dictates otherwise. Thus, for example, the term "a member" is intended to mean a single member or a combination of members, "a material" is intended to mean one or more materials, or a combination thereof. The term "substantially" may be understood to encompass a variation of 10%, for example.

While the term zero liquid discharge is used herein, it should be understood that in some implementations, the waste stream may include some amount of liquids. That is, as the term is used in the art, it may encompass near-zero liquid discharge or minimal liquid discharge, and the solids discharged may include some amount of liquid moisture. Likewise, a ZLD process may include, in embodiments, a filter press or centrifuge process to remove residual moisture from the precipitated solid waste after processing with the system.

While common reference numerals are used to denote commonly named components, this should not be taken to mean that those components must be identical. In practice, they will be designed in accordance with operational considerations of the various systems, including, for example, flow rates, type of influent, concentration of contaminants, and the like. So, for example, while each system described includes a primary condenser/secondary evaporator, those may, in practice, take somewhat different forms.

As used in this specification, the term "fluid" may be understood to refer to a liquid, a gas, a liquid including solids which may be in solution or entrained, or combinations thereof. The terms "atomize" and "vaporize" describe the process of reducing a liquid or solution into a series of tiny particles, droplets and/or a fine spray. For example, as used herein, a device or component configured to atomize a liquid and/or produce and atomized flow of a liquid can be any suitable device or component that reduces and/or "breaks" the liquid into a series of tiny particles and/or a fine spray.

The descriptions above are intended to be illustrative, not limiting. Thus, it will be apparent to one skilled in the art that modifications may be made as described without departing from the scope of the claims set out below.

The invention claimed is:

1. An atomizer comprising:

an influent inlet, configured and arranged to receive a flow of fluid containing contaminants;

a gas flow inlet, configured and arranged to receive a flow of gas to be mixed with the fluid in a mixing zone;

an airflow controlling component, the airflow controlling component comprising a plurality of vanes, the vanes being disposed between the gas flow inlet and the mixing zone, and configured and arranged to impart a rotational component to a direction of flow of the gas, the airflow controlling component further having a downstream face that is arranged adjacent to and spaced apart from a cooperating upstream face of a second component, the downstream face of the airflow controlling component and the cooperating upstream face of the second component together defining the mixing zone;

the second component further defining a channel, in fluid communication with the influent inlet and configured to receive the flow of fluid containing contaminants, and to conduct the flow of fluid containing contaminants to the mixing zone, the channel and mixing zone being configured such that, in use, radially outwardly flowing fluid containing contaminants is mixed with radially inwardly flowing gas to atomize the fluid containing contaminants; and an outlet, configured and arranged to receive atomized material from the mixing zone and to output the atomized material received from the mixing zone, wherein adjacent pairs of vanes of the plurality of vanes define a channel therebetween, and an each vane is configured such that a width of an outlet side of the channel is greater than a width of a central region thereof.

2. An atomizer as in claim 1, wherein the outlet is frustoconical, and is narrower at an inlet side and wider at an outlet side thereof.

3. An atomizer as in claim 1, wherein each vane is further configured such that a width of an inlet side of the channel is greater than a width of the central region.

4. An atomizer as in claim 1, wherein the upstream face of the second component includes an annular recessed region at central portion thereof, the annular recessed region defining a downstream boundary of the mixing zone; wherein the atomizer is adjustable to vary a distance between the downstream face of the airflow controlling component and the upstream fac-e-face of the second component to vary a volume of the mixing zone.

5. An atomizer as in claim 1, wherein the contaminants are selected from the group consisting of: suspended solids, dissolved solids, bacteria, heavy metals, fungi, pharmaceuticals, plastic particles, and nano materials.

6. An atomizer as in claim 1, wherein the outlet includes a centrally located projection that extends into a path of atomized material from the mixing zone and the projection is configured and arranged to occupy space that, in the absence of the projection, would be a dead zone.

7. An atomizer as in claim 1, wherein the outlet includes a centrally located projection that extends into a path of atomized material from the mixing zone to reduce regions of low speed flow in the outlet.

8. An atomizer as in claim 6, wherein the projection is conical.

9. An atomizer as in claim 8, wherein the projection is in the shape of a paraboloid.

10. A method of treating water comprising atomizing the water using an atomizer as recited in claim 1.

11. A water treatment system comprising an atomizer as recited in claim 1.

12. A water treatment system comprising:
  a blower motor, configured and arranged to blow a mixture of air and influent containing contaminants through the system;
  a primary evaporator, including an atomizer comprising:
    an influent inlet, configured and arranged to receive a flow of fluid containing contaminants;
    a gas flow inlet, configured and arranged to receive a flow of gas to be mixed with the fluid in a mixing zone;
    an airflow controlling component, the airflow controlling component comprising a plurality of vanes, the vanes being disposed between the gas flow inlet and the mixing zone, and configured and arranged to impart a rotational component to a direction of flow of the gas, the airflow controlling component further having a downstream face that is arranged adjacent to and spaced apart from a cooperating upstream face of a second component, the downstream face of the airflow controlling component and the cooperating upstream face of the second component together defining the mixing zone;
    the second component further defining a channel, in fluid communication with the influent inlet and configured to receive the flow of fluid containing contaminants, and to conduct the flow of fluid containing contaminants to the mixing zone, the channel and mixing zone being configured such that, in use, radially outwardly flowing fluid containing contaminants is mixed with radially inwardly flowing gas to atomize the fluid containing contaminants; and
    wherein adjacent pairs of vanes of the plurality of vanes define a channel therebetween, and an each vane is configured such that a width of an outlet side of the channel is greater than a width of a central region thereof;
  an outlet, configured and arranged to receive atomized material from the mixing zone and to output the atomized material received from the mixing zone; and
  a heat exchanger that is configured to receive the mixture from the mixing zone, and to act as both a secondary evaporator and a primary condenser.

13. A water treatment system in accordance with claim 12, further comprising an interface between the atomizer and the heat exchanger.

14. A water treatment system in accordance with claim 13, wherein the interface comprises a frustoconical housing connected at a first, wider end to the atomizer, and at a second, narrower end, to the heat exchanger.

15. A water treatment system in accordance with claim 13, wherein the outlet includes a centrally located projection that extends into a path of atomized material from the mixing zone to reduce regions of low speed flow in the outlet.

* * * * *